United States Patent [19]

Dietrich

[11] 3,853,970

[45] Dec. 10, 1974

[54] VINYL CHLORIDE GRAFT POLYMERS AND PROCESS FOR PREPARATION THEREOF

[75] Inventor: Joseph J. Dietrich, Painesville, Ohio

[73] Assignee: Diamond Shamrock Corporation, Cleveland, Ohio

[22] Filed: Aug. 3, 1973

[21] Appl. No.: 385,392

Related U.S. Application Data

[63] Continuation-in-part of Ser. No. 180,546, Sept. 15, 1971, abandoned, which is a continuation-in-part of Ser. No. 761,840, Sept. 23, 1968, abandoned.

[52] U.S. Cl.......... 260/878 R, 260/31.2 R, 260/42, 260/42.18, 264/331
[51] Int. Cl. ............................................ C08f 29/22
[58] Field of Search .............................. 260/878 R

[56] References Cited
UNITED STATES PATENTS

| | | | |
|---|---|---|---|
| 2,422,392 | 6/1947 | Brubaker et al. ............. | 260/87.5 C |
| 2,657,200 | 10/1953 | McGrew et al. .............. | 260/85.5 R |
| 3,322,858 | 5/1967 | Coaker et al. ................ | 260/878 R |
| 3,358,054 | 12/1967 | Hardt et al..................... | 260/878 R |
| 3,475,396 | 10/1969 | McCain et al. ................ | 260/92.1 |
| 3,557,253 | 1/1971 | Sugimoto et al. ............. | 260/878 R |

*Primary Examiner*—Harry Wong, Jr.
*Attorney, Agent, or Firm*—Helen P. Brush

[57] ABSTRACT

A graft copolymer is described which contains, by weight, from about 60% to 95% of polymerized vinyl chloride and from 5% to 40% of an ethylene/vinyl acetate copolymer backbone which, in turn, contains from 10% to 40%, by weight, of polymerized vinyl acetate. This graft copolymer is thermally stable and has both good physical properties and vastly improved processing characteristics, particularly for injection molding operations. The copolymer is prepared in aqueous suspension at polymerization temperatures ranging from 90° C to 165° C employing a suitable, monomer-soluble, free-radical type initiator which is injected into the reaction mixture at a prescribed rate throughout the reaction.

7 Claims, 2 Drawing Figures

VINYL CHLORIDE GRAFT POLYMERS AND PROCESS FOR PREPARATION THEREOF

CROSS-REFERENCE TO RELATED APPLICATIONS

This application is a continuation-in-part of my copending application, Ser. No. 180,546, filed Sept. 15, 1971, which application is, in turn, a continuation-in-part of application Ser. No. 761,840, filed Sept. 23, 1968, now both abandoned.

BACKGROUND OF THE INVENTION

This invention is related to rigid resinous compositions for molding, extrusion, thermoforming and other hot shaping operations, which compositions have improved processing characteristics in combination with good physical properties and thermal stability. More particularly, this invention relates to thermoformable composition which are graft copolymers of vinyl chloride onto a backbone or trunk polymer specifically which is a preformed ethylene/vinyl acetate copolymer.

Homopolymers of vinyl chloride inherently possess desirable strength properties and excellent chemical resistance, but generally can be processed only with difficulty in the absence of process modifiers or modifying treatment. Further, these materials typically yield products of low impact strength, i.e., they are easily fractured upon impact. In efforts to overcome these deficiencies, various interpolymers of vinyl chloride and one or more plasticizing comonomers polymerizable therewith have been developed and used heretofore in the art with varying degrees of success.

More recently, graft copolymers of poly(vinyl chloride) have become available in the art. They are produced, for example, by heating a mixture containing vinyl chloride monomer, a preformed polymeric material (designated generally as the substrate polymer, backbone polymer or trunk polymer) and a sufficient quantity of a free-radical generating compound to sustain the grafting reaction, at a temperature ranging from 20° to 80° C. Grafting processes of this type wherein an ethylene/vinyl acetate copolymer specifically is utilized as the backbone polymer have been described in numerous patents, e.g., in U.S. Pat. Nos. 3,322,858; 3,358,054; and 3,414,638; and in British Patent Specification Nos. 1,020,704 and 1,021,324. While such graft products generally provide finished articles having improved impact strengths over poly(vinyl chloride) per se, these copolymers have not provided the desired improved processing characteristics for many applications. On the other hand, neither have mechanical or physical blends of poly(vinyl chloride) and available ethylene/vinyl acetate copolymers having a similar overall composition to the graft copolymer materials possessed the desired lubricity and workability at normal processing temperatures.

Still more recently, in efforts to obtain easier processing poly(vinyl chloride) compositions, more complex graft materials have been developed wherein the above-described basic vinyl chloride-ethylene/vinyl acetate graft copolymers are significantly modified both in structure and in composition. In some instances, the backbone copolymer has been at least partially saponified or hydrolyzed prior to contact with the vinyl chloride monomer. For other materials, at least one other comonomer has been grafted along with vinyl chloride onto either the unmodified or saponified copolymer backbone. These compositions may be processed alone or in admixture with poly(vinyl chloride). In still other instances, additional elastomeric backbone copolymers are incorporated in the graft reaction mixture. Such modified compositions possess somewhat improved processing characteristics over the unmodified materials, exhibiting greater smoothness and uniformity in extrusion and molding, while maintaining the desirable physical properties of poly(vinyl chloride) to a substantial degree. These materials are described, for example, in U.S. Pat. Nos. 3,305,606; 3,355,516; 3,454,674; 3,557,253 and 3,580,975; and in British Patent Specification No. 1,075,643.

I have now found that free-flowing, pulverulent poly(vinyl chloride) compositions which are thermally stable materials possessing excellent processing characteristics and good physical properties may be prepared merely by grafting vinyl chloride onto an unmodified ethylene/vinyl acetate copolymer without the inclusion of additional plastifying comonomers and/or elastomeric backbone polymers. To obtain these improved compositions, the grafting reaction is conducted at 90–165° C, rather than at 20–80° C as employed heretofore, along with incremental initiator addition. My compositions provide by extrusion, injection molding and other hot shaping techniques, finished plastic articles having excellent impact strength and commercially acceptable physical properties.

SUMMARY OF THE INVENTION

Accordingly, the present invention comprises tough, easily processed graft copolymers of poly(vinyl chloride) onto an unmodified ethylene/vinyl acetate copolymer. These products are prepared in an aqueous suspension medium by contacting a major proportion of vinyl chloride monomer with a minor proportion of a preformed ethylene/vinyl acetate copolymer at a reaction temperature of 90–165° C and in the presence of a monomer-soluble, free-radical type initiator for the grafting reaction, which initiator is injected into the reaction mixture at a prescribed rate throughout the reaction. The polymerization mixture contains, by weight, from 60% to 95% of vinyl chloride and from 5% to 40% of the preformed copolymer. The preformed copolymer, in turn, generally contains, by weight, from 10% to 40%, preferably from 15% to 30% and still more preferably from 18% to 28% of polymerized vinyl acetate.

The polymeric products of this invention are free-flowing, finely granular, rigid materials which offer significant advantages over the conventionally-prepared unmodified vinyl chloride-ethylene/vinyl acetate graft copolymers of the prior art. In contrast to the prior art graft copolymers, the products of this invention exhibit lower melt viscosity characteristics. Specifically, the graft copolymers of this invention exhibit melt viscosities which are no greater than $9 \times 10^4$ poises at 180° C and no greater than $1 \times 10^4$ poises at 210° C when measured at a shear rate of 10 $\text{sec}^{-1}$.

DESCRIPTION OF THE PREFERRED EMBODIMENTS

As described previously, the graft copolymers of this invention generally contain, by weight, a major proportion of polymerized vinyl chloride (PVC), i.e., from about 60% to 95%, and a minor proportion of the preformed ethylene/vinyl acetate copolymer (EVA), i.e., from about 5% to 40%. The presently preferred products comprise, by weight, from 75% to 85% of PVC and from 15% to 25% of the EVA copolymer. It has been found that the proportions of the polymeric components should fall within the above-specified ranges to provide graft products having optimum easy processing characteristics, coupled with thermal stability, high impact strength and adequate tensile properties.

The average composition of the preformed EVA copolymers utilized is critical for obtaining the desired graft copolymer products. These copolymers should contain, in general, from 60% to 95% of chemically combined ethylene, by weight, and from 5% to 40%, by weight, of chemically combined vinyl acetate. They can be prepared by any conventional technique now known in the art. Typically, they are prepared in a homogeneous liquid phase utilizing one or more organic liquids as the solvent medium, with or without the inclusion of minor quantities of water, a lower alkanol or the like, copolymerization being effected at elevated temperatures, e.g., 45–250° C and 3000–30,000 psig, with the aid of a suitable free-radical-forming compound as polymerization initiator. Processes for preparing these copolymer materials are described, for example, in U.S. Pat. Nos. 2,947,753; 3,325,460; and 3,451,981; in British Patent Specifications Nos. 859,743; 929,138; and 1,100,523; and German Auslegeshriften No. 1,520,433. An examination of these disclosures will give an indication of the general method by which these materials may be made. It should be noted, however, that the EVA base copolymers employed in this invention are per se conventional, known materials and any particular method for their manufacture does not, in itself, constitute a part of the present invention.

In addition to their aforedescribed critical composition, suitable preformed EVA copolymers are of medium to high average molecular weight, with inherent viscosities of 0.50–1.50 as measured at 30° C, employing solutions containing 0.25 g of the copolymer in 100 ml of toluene (in accordance with ASTM Procedure D1243-60, Method A).

As previously pointed out herein, those particular EVA copolymers having chemically combined ethylene and vinyl acetate contents respectively of 72–82% and 18–28%, by weight, are particularly advantageous as graft copolymer products prepared therefrom have optimum toughness and strength properties coupled with excellent melt flow properties.

From extraction studies, the graft copolymer products are found to be largely homogeneous in composition, inasmuch as they contain no ungrafted EVA copolymer, although some vinyl chloride homopolymer may be present. It will easily be appreciated by those skilled in the art that the substantial homogeneity of these materials contributes in part to their improved processing characteristics by comparison to prior graft copolymers of similar composition, while at the same time providing good overall physical properties, freedom from plate-out, etc.

As described previously, the graft copolymer products of this invention exhibit, by comparison to either conventional graft copolymers of similar composition or to vinyl chloride homopolymers of low average molecular weight, vastly improved melt flow properties, i.e., melt viscosity, making them particularly adaptable to all types of thermoforming fabrication techniques. Particularly, because of their much improved melt flow properties, these graft copolymers can be successfully employed to fabricate finished plastic articles by injection molding whereas neither the aforementioned prior art graft copolymers or vinyl chloride homopolymers have been so processed with any significant degree of success.

Figure 1:
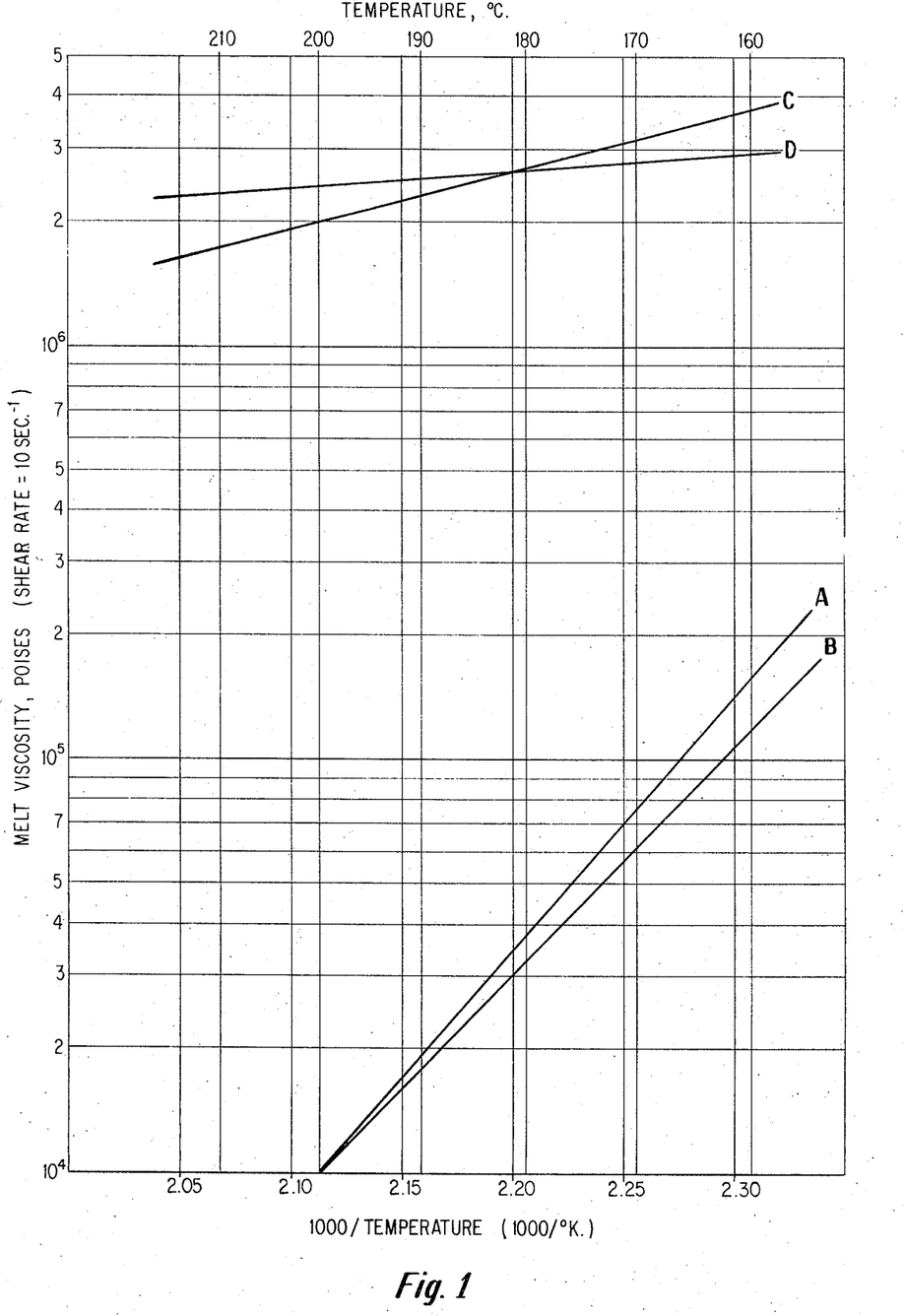

In the accompanying FIG. 1, the comparative rheological flow properties of two representative graft copolymers of this invention and those of two commercially-available vinyl chloride-ethylene/vinyl acetate copolymer products are graphically illustrated. In each instance, the flow properties of the particular copolymer were determined in a Sieglaff-McKelvey Capillary Rheometer using a capillary 1-inch long, 0.040 inch in diameter, at a temperature range of 170–210° C at a constant shear rate of 10 $sec^{-1}$. Each copolymer sample employed was a formulation prepared by blending 3 parts of a liquid organotin mercaptide stabilizer for each 100 parts, by weight, of the particular copolymer on a two-roll mill at approximately 340° F. Curve A of FIG. 1 illustrates the typical rheological flow pattern of a graft copolymer product of this invention which contains, by weight, approximately 78% of PVC and about 22% of an EVA copolymer (26–28% polymerized vinyl acetate). The preparation of this copolymer is described hereinafter in Example 2. Curve B illustrates the typical rheological flow pattern of a graft copolymer product of this invention containing, by weight, about 95% PVC and about 5% EVA copolymer (40% polymerized vinyl acetate), which copolymer is the product of Example 4 herein. Curve C is the rheological flow pattern of a commercial graft copolymer (SUMIGRAFT GA-1027 Sumitomo Chemical Co., Ltd.) prepared at conventional temperatures of 50–60° C, which copolymer contains, by weight, approximately 94% PVC and 6% EVA copolymer; and Curve D is obtained for a copolymer likewise prepared at conventional temperatures which contains, by weight, 90% PVC and about 10% EVA copolymer (GRAFRENE TH-111 - Japanese Geon Co., Ltd.).

As shown in FIG. 1, by heating each of the copolymers under constant shear rate over a temperature range which encompasses the usual processing temperatures for vinyl chloride polymers, i.e., 170–210° C, the graft copolymers of this invention have melt viscosities greater than 100 times lower than the similarly-tested conventional, commercially-available graft copolymers. It should be noted that in processing vinyl chloride polymers, temperatures of 170–210° C cannot be substantially exceeded without effecting thermal degradation in the polymers.

The significantly lower melt viscosities possessed by the graft copolymers of this invention make them particularly adapted for easy processing in all types of equipment, providing finished plastic articles characterized by good physical properties and high impact strength.

Figure 2:
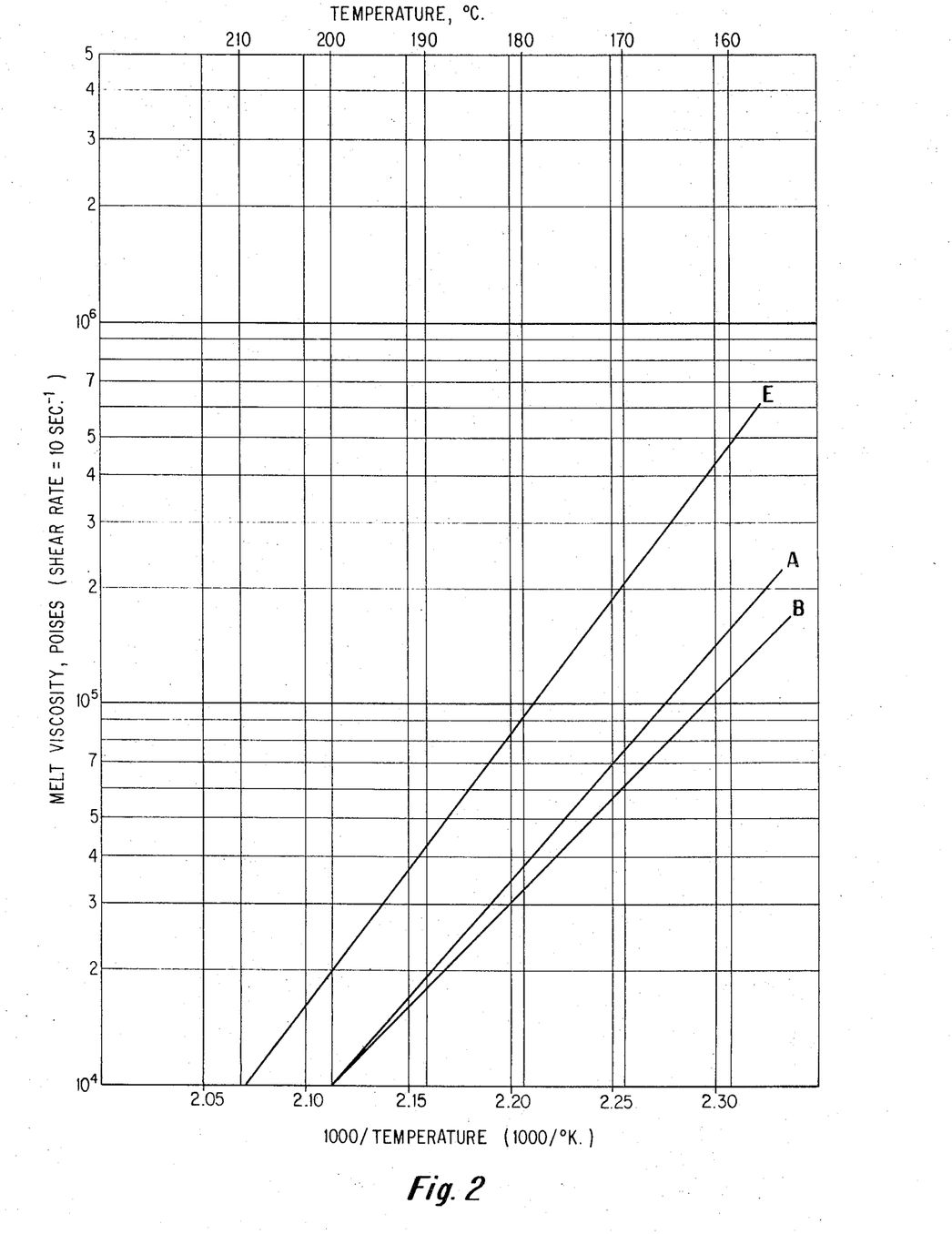

The accompanying FIG. 2 illustrates the comparative rheological flow pattern of a low molecular weight vinyl chloride homopolymer (Curve E) in relation to those of the graft copolymer products of the invention (Curves A and B). This flow pattern was measured as described for obtaining the numerical data illustrated in FIG. 1. The low molecular weight homopolymer employed is prepared via aqueous suspension polymerization and has a specific viscosity of 0.66, as determined at 30° C for a 1% solution of the polymer in cyclohexanone. Vinyl chloride homopolymers with average molecular weights similar to that of this particular polymer sample have been processed heretofore with moderate success via injection molding techniques.

As shown in FIG. 2, the melt viscosity of the vinyl chloride homopolymer, at any particular temperature is markedly higher than those for the graft copolymer products. As a further correlation of these data, actual processing of the different polymeric materials showed the graft copolymers of this invention to process much easier than the homopolymer, especially in injection molding. In particular, injection molding processes require, for satisfactory results, polymer materials which have melt viscosities sufficiently low to enable them to flow rapidly through the small orifices of the molding machine, fill the mold activity and thus form the part being produced. Vinyl chloride homopolymers with higher melt viscosities than shown by Curve E in FIG. 2 are generally unsatisfactory for commercially-feasible injection molding processes. The graft copolymer products of this invention will provide high-quality, commercially-acceptable injection molded products more consistently than any presently used low molecular weight homopolymer.

Because of their extremely low melt viscosities at conventional processing temperatures, the graft copolymer products of this invention can successfully be processed at temperatures substantially lower, i.e., at temperatures 40–50° F below those employed for conventional vinyl chloride homopolymers. At the same time, the thermal stability of these products is on a par with the conventional materials. In practice, therefore, conditions employed in processing the graft copolymers need not be as critical as for the homopolymer materials which have degradation temperatures proximate to their processing temperatures.

The graft copolymer products herein possess a unique combination of low melt viscosity at typical processing temperatures coupled with good physical properties and good thermal stability. All of these characteristics cannot be found in prior art vinyl chloride-ethylene/vinyl acetate graft copolymers even though these materials may have an overall composition similar to the products of this invention.

Likewise, all of these characteristics cannot be found in physical blends of a conventional ethylene/vinyl acetate copolymer and a low molecular weight vinyl chloride homopolymer such as described, for example, in U.S. Pat. No. 3,767,633, issued Oct. 23, 1973. This homopolymer is prepared at a temperature of 90–165° C and is found to be highly branched in structure. The polymerized vinyl chloride segments of the graft copolymer of this invention, like the aforesaid homopolymer product, are believed also to be highly branched in configuration, due to the elevated polymerization temperatures employed in its preparation.

As known in the art, it is possible to obtain finished plastic articles with good physical properties whether employing presently available vinyl chloride-ethylene/vinyl acetate graft copolymers or physical blends of suitable vinyl chloride homopolymers with EVA copolymers. However, it is not possible to use interchangeably either a physical blend of vinyl chloride homopolymer and an EVA copolymer or a graft copolymer of this invention and obtain the desired results in each instance. For example, a mixture containing, by weight 80 parts of the aforementioned low molecular weight homopolymer (specific viscosity = 0.40, determined as previously described) and 20 parts of an EVA copolymer (ULTRATHENE UE-634, Melt Index = 3 - U.S.I. Chemicals) is milled on a 2-roll mill at 250° F over an extended time period. However, continued fluxing of the mixture does not produce coherent plastic sheet stock. The blend remains weak and crumbly.

Accordingly, it is not possible to duplicate even the processing characteristics of the graft copolymer of this invention by employing physical blends of EVA copolymers with vinyl chloride homopolymers of low melt viscosity.

The graft copolymers of this invention are prepared in an aqueous suspending medium essentially as carried out in the prior art, except that reaction temperatures of 90–165° C are employed. Also, the polymerization initiator requirement is injected into the reaction mixture at a prescribed rate during the reaction.

The grafting reaction optionally may be conducted under a pressure in excess of the vinyl chloride monomer vapor pressure, the excess pressure being supplied by the injection of water, as needed, into the reactor. In such instances, pressures up to 5000 psig may suitably be employed.

In the process of this invention, the amount of free-radical-generating compound necessary to initiate and sustain the grafting reaction is injected at a prescribed rate throughout the reaction, rather than being totally charged to the reaction mixture initially. It has been found that by supplying the initiator requirement by incremental addition, a convenient means is provided for controlling the reaction rate, thereby indirectly controlling the reaction temperature. By thus controlling the reaction exotherm, thermally stable products can be obtained. Likewise, the product can be reclaimed from the reactor as a free-flowing, granular product. Further, it is believed that more homogeneous grafting is effected at the significantly elevated reaction temperatures employed if the initiator is supplied in this manner. Thus, graft polymer products can be obtained which are homogeneous, thermally stable materials possessing optimum flow properties, while exhibiting adequate toughness and strength properties.

It should likewise be noted that incremental or continuous initiator addition makes it possible to utilize many initiators which normally would be extremely unstable at the elevated reaction temperatures employed and thus could not be used.

In general methods for carrying out the process, the water, EVA preformed copolymer and suspending or dispersing agent are charged initially into a suitable agitated reactor, after which the reactor is sealed and purged of oxygen, such as with a vacuum and/or an inert gas. The vinyl chloride is then charged to the reactor, after which the aqueous reaction mixture is heated with agitation to a temperature ranging from 90–165° C and, optionally, the reaction pressure is raised to the desired level. Advantageously, the reaction mixture is agitated for a short time prior to initiator addition to swell and at least partially dissolve the preformed copolymer in the monomer whereby grafting efficiency is increased. Thereafter, while agitation of the monomer suspension is continued, the free-radical generating polymerization initiator is injected continuously into the reactor at a prescribed rate throughout the reaction.

The initiators suitably employed herein may be any of the presently available monomer-soluble, free-radical generating compounds which have normally been employed heretofore for polymerizing, e.g., vinyl chloride in aqueous suspension, providing these compounds have "half-lives" which are short enough so that they will be essentially all destroyed during polymerization and will not remain in the finished polymeric product to cause its decomposition during processing. Depending upon the particular polymerization temperature employed, specific suitable initiators include 2,4-dichlorobenzoyl peroxide, caprylyl peroxide, lauroyl peroxide, tertiary butyl peroxyisobutyrate, tertiary butyl peroxypivalate, benzoyl peroxide, p-chlorobenzoyl peroxide, hydroxyheptyl peroxide, cyclohexanone peroxide, ditertiary butyl diperphthalate, tertiary butyl peracetate, tertiary butyl perbenzoate, dicumyl peroxide, tertiary butyl hydroperoxide, methyl ethyl ketone peroxide, ditertiary butyl peroxide, acetyl cyclohexane sulfonyl peroxide, di(sec-butyl)peroxy dicarbonate and isobutyryl peroxide. Of these compounds, those which are especially preferred at present have a half-life within the polymerization range which is generally from 0.1 second to 12 minutes, preferably from 0.5 minute to 5 minutes. Specific such preferred initiators include, for example, benzoyl peroxide, tertiary butyl peroxypivalate, lauroyl peroxide, 2,4-dichlorobenzoyl peroxide, caprylyl peroxide, tertiary butyl peracetate and p-chlorobenzoyl peroxide.

The overall concentration of initiator employed ranges generally from 0.01% to 2.0%, based on the total monomer charge. The preferred concentration of initiator is 0.05% to 0.5% by weight of the monomer.

In the polymerization reaction, an initial water to monomer ratio ranging generally from 0.4 to 6:1 is utilized, with a water-to-monomer ratio of 0.5 to 2:1 being preferred.

The suspending agent which is employed to aid in maintaining a stable suspension of monomer in the aqueous medium may be any of those dispersing agents or protective colloids now normally used in vinyl chloride polymerization systems for this purpose, providing such materials are both stable and completely soluble at the polymerization temperatures. Suitable suspending agents presently include, for example, polyvinyl alcohol, the carboxymethyl celluloses, polyvinyl pyrrolidone and copolymers thereof and nonionic alkylene oxide-alkylene glycol products. The concentration of suspending agent employed ranges generally from 0.05 to 4%, and preferably from 0.1 to 2%, by weight of the monomer.

As described previously, the process of this invention is conducted at a temperature ranging from 90–165°C. Within this temperature range, the minimum reaction pressure will, of course, be that provided by vinyl chloride vapor at the particular temperature employed, depending upon the composition of the copolymerization reaction mixture. Accordingly, at a temperature of 90° C, the minimum reaction pressure will be about 250 psig; at 100° C, the minimum pressure will be about 280 psig, etc. Optionally, additional pressure may be supplied, e.g., by water injection, to assure liquid-full reactor conditions. In such instances, total reaction pressures typically will range from about 400 psig to 1500 psig. Utilization of hydrostatic pressure reduces the overall reaction time, accelerating the grafting reaction. In any event, the overall maximum pressure which may be employed, e.g., 5000 psig, will be limited by the pressure rating of the polymerization reactor.

In general, the process of this invention may be conducted in a time period of from 1 to 12 hours depending upon the specific polymerization temperature, the particular initiator and initiator concentration utilized. The total reaction time, i.e., the polymerization rate, will also be influenced by the efficiency with which the heat of reaction is removed from the polymerization mixture. In present practice, effective removal of this exothermic heat can be accomplished by utilizing jacketed reactors or, more advantageously, by submerging in the reaction mixture a coil through which cold water may be passed. In present practice, when a cooling coil is employed, 85% to 95% monomer conversion usually may be realized in a time period ranging from 1 to 3 hours. Thus, the process of this invention provides an extremely economical method for producing vinyl chloride graft copolymers.

The finished copolymer products are analyzed for total chlorine content, from which value the total percentage of polymerized vinyl chloride in any particular product is then calculated. The percentage of EVA copolymer therein is then determined from this calculated value by difference.

The compositions of this invention may be processed successfully without the addition of external lubricants, resinous processing aids and the like. Typically, prior to processing, they are admixed only with minor quantities, i.e., 0.5–3%, by weight of copolymer, of one or more thermal stabilizers as known and used in the art for stabilizing poly(vinyl chloride) against degradation at elevated temperatures. However, the present compositions additionally may be admixed with materials such as fillers and colorants and also external lubricants to provide satisfactory molding formulations. Particularly good results are obtained from graft compositions reinforced with inorganic components such as glass fibers or asbestos.

The graft copolymer compositions of this invention also may be advantageously blended with other polymeric materials, e.g., vinyl chloride homopolymers, to provide molding formulations from which finished articles are obtained with, e.g., much improved impact strength properties compared to those from the straight homopolymers.

In order that those skilled in the art may more completely understand the present invention and the preferred methods by which it may be carried out, the following examples are given. In these examples and elsewhere herein, where proportions of ingredients may be given in parts, such proportions are by weight unless otherwise noted.

EXAMPLE 1

A 100-gallon nickel-clad, stainless steel jacketed reactor rated at 500 psig is fitted with a mechanical stirrer, a thermocouple, a pressure gauge, ports for charging ingredients and a rupture disc connected to a vent line.

To this reactor are charged 61 gallons of deionized, degassed water, 29 lbs 8 oz of 2.25% solution of polyvinyl alcohol in water and 82.5 lbs of an EVA copolymer containing 26–28% polymerized vinyl acetate, by weight (ULTRATHENE UE-634, Inherent Viscosity = 0.99; Density = 0.95 - U.S.I. Chemicals). The reactor is sealed and purged of oxygen repeatedly by successive evacuations to 27–29 inches Hg and releasing the vacuum with vinyl chloride. The reactor is then charged with 330 lbs of distilled vinyl chloride with agitation and is agitated for 1 hour to at least swell the preformed copolymer. The reaction mixture is then heated to 100° C, after which sufficient deionized, degassed water is pumped into the reactor to obtain a reaction pressure of about 410 psig. At this pressure, the reactor is substantially liquid-full.

While agitation is continued, injection of t-butyl peroxypivalate initiator (8% solution in absolute methanol) is begun at a rate of approximately 50 ml of solution every 5 minutes. Thereafter, until the copolymerization is complete, the initiator is continuously fed into the reactor at this rate, the total amount of initiator used being 160 g (75% active). Likewise, 60 liters of deionized water is pumped into the reactor to maintain substantially liquid-full reactor conditions. After initiator addition is stopped, the reaction mixture is agitated for an additional 30 minutes to assure decomposition of all traces of initiator. The batch is then cooled to ambient temperature. The total reaction time, after starting initiator addition until cooling, is approximately 3¼ hours.

After cooling the reaction mixture, the granular copolymer product is isolated, purified by repeated washings with deionized water, and finally dried to a moisture content of less than 0.1 weight percent. Yield of copolymer product is 88% of theoretical.

Extraction tests were conducted on this copolymer with hot cyclohexanone. The insoluble fraction remaining was found to contain a percentage of chlorine corresponding to at least 60%, by weight of vinyl chloride therein. Similar extractions using hot toluene as extractant isolated a soluble fraction. Upon evaporation of the solvent, this fraction was found to contain a percentage of chlorine equivalent to the weight percent of vinyl chloride in the graft copolymer product. Based on these findings, it may be assumed that the graft copolymer contains no free substrate copolymer. However, it may contain straight vinyl chloride homopolymer.

Physical Properties of the Graft Copolymer

Following are average physical properties determined, using test specimens of the copolymer prepared by blending together for each 100 parts of the copolymer, 3 parts of a liquid organotin mercaptide stabilizer (T-66-Metal and Thermit Corp.), milling the blended material for 5 minutes on a 2-roll mill at 375° F, and then compression molding the resulting fluxed stock at 350° F with increasing pressure up to 10,000 psig in a total molding cycle of 8 minutes. Results are as follows:

|  | ASTM Test |  |
|---|---|---|
| Ultimate Tensile Strength, psi | D638-64T | 3540 |
| Tensile Modulus, psi | do. | $2.02 \times 10^5$ |
| Elongation at Break, % | do. | 95 |
| Hardness, Shore D | D2240-64T | 72 |
| Impact Strength, ft lbs/in. Notch | D256-56 | 18 |
| Heat Deflection at 264 psi, °C | D648-56 | 55 |
| Low Temperature | | |

|  | ASTM Test | -Continued |
|---|---|---|
| Brittleness, °C | D746-64T | −11.6 |
| Melt Index, g/10 min[1] | D1238-62T | 18.5 |

[1]Melt index conducted at 190° C in Extrusion Plastomer with 0.0825 orifice, employing a 2160 g load for the initial 4 minutes of heating, thereafter applying a 12,400 g load to start flow.

For comparison purposes, a commercially-available graft copolymer containing 10%, by weight of EVA preformed copolymer was similar tested for flow properties, according to D1238-62T. This material would not begin to flow in the Plastomer even under the applied loads for 13 minutes at 190° C. Additional weights (20,000 g total) had to be applied to initiate flow. After flow was initiated, the total time for the copolymer to discharge completely from the Plastomer cylinder was 25 minutes. The heat deflection temperature of this copolymer, tested as previously described, is 58° C at 264 psi.

Filled compositions of the copolymer product with calcium carbonate, asbestos, and fiberglass are mixed, milled at 285° F for 5 minutes, and then compression molded at 300° F and at a pressure of 1000 psig for 5 minutes. Following are average physical properties obtained on these moldings (ASTM 638-64T).

TABLE 1

|  | Calcium Carbonate | | Asbestos | Glass Fiber |
|---|---|---|---|---|
| Filler Level, phr | 50 | 100 | 75 | 25 |
| Tensile Strength, psi | 4040 | 4390 | 7130 | 5720 |
| Tensile Modulus, psi (× 10³) | 260 | 345 | 680 | 445 |
| Heat Deflection Temperature at 264 psi, °C | 57 | 59 | 69 | 65 |

EXAMPLE 2

Employing the equipment and general charging procedure as described in Example 1, a graft copolymer product of this invention is prepared at 100° C, employing nonliquid-full reactor conditions with continuous initiator addition throughout the reaction. In this example, 30 gallons of deionized, degassed water, 23 lbs 11 oz of the poly(vinyl alcohol) solution, 66.5 lbs of the previously described UE-634 EVA copolymer and 266.5 lbs vinyl chloride are employed. The maximum reaction pressure is ≈280 psig. The total concentration of t-butyl peroxypivalate is 160 g (0.13%, by weight, of monomer). The total reaction time from introduction of initiator to cooling of the polymerization mixture is 6 hours.

The free-flowing, granular graft copolymer product is isolated, purified and dried as previously described. Total yield of finished product is 89.4% of theoretical. It contains, by weight, approximately 78% polymerized vinyl chloride and about 22% of the ethylene/vinyl acetate copolymer.

Average physical properties of this copolymer are determined as described in Example 1 with the following results:

| Property | Result |
| --- | --- |
| Ultimate Tensile Strength, psi | 3795 |
| Tensile Modulus, psi | 1.87 × 10$^5$ |
| Elongation at Break, % | 125 |
| Hardness, Shore D | 73 |
| Impact Strength, ft lbs/in. Notch | 20.3 |
| Heat Deflection at 264 psi, °C | 54 |
| Low Temperature Brittleness, °C | −10 |
| Melt Index (190° C), gms/10 min | 8.3 |

EXAMPLE 3

Employing a 10-gallon stainless steel reactor, fitted as outlined in Example 1 plus a cooling coil in the reactor, a graft copolymer is prepared as follows.

A solution of 72.2 g of polyvinyl alcohol in 3600 ml of deionized, degassed water, 5 gallons of deionized water and 4 lbs of a preformed EVA copolymer containing 18% polymerized vinyl acetate, by weight, (UE-630, Inherent Viscosity = 0.89; Density = 0.937 - U.S.I. Chemicals) are charged to the reactor. After sealing and evacuating the reactor as previously described, 7330 g of vinyl chloride monomer is charged, the reaction mixture is heated to 100° C and deionized water is pumped into the reactor to attain a pressure of 550 psig.

Ten ml of a solution of t-butyl peroxypivalate (40 g initiator diluted to 200 ml with monochlorotrifluoromethane) is then pumped into the reactor and the reaction mixture is stirred for 15 minutes. During this time period, 870 ml of $H_2O$ is added to maintain the operating pressure, indicating substantial polymerization effected. Thereafter, 10 ml of the initiator solution is added every 5 minutes until the reaction is completed and no additional water needs to be added. The total reaction time from first addition of initiator is 75 minutes. The total concentration of initiator employed is 0.285%, by weight, of the vinyl chloride monomer charge.

The finely-granular graft copolymer product is isolated, purified and dried as in the previous examples. Yield of product (19.1 lbs) is 95% of theoretical. As determined by chlorine analysis, the product contains, by weight 20% of the ethylene/vinyl acetate copolymer.

Average physical properties of this product are determined on injection molded test specimens prepared from a milled and diced formulation (100 parts copolymer/2 parts stabilizer) in a Mini-Jector molding machine, Model 65-HA 100 (Newbury Industries, Newbury, Ohio). Molding conditions: cylinder temperature - 350° F; nozzle - 340° F; mold - 115° F; injection pressure - 700–800 psig; molding cycle - 14.5 sec (injection), 10 sec (prepack), 30 sec (cure).

Values obtained using ASTM test procedures as previously described are as follows:

| Property | Result |
| --- | --- |
| Ultimate Tensile Strength, psi | 4400 |
| Tensile Modulus, psi | 2.3 × 10$^5$ |
| Elongation at Break, % | 70 |
| Hardness, Shore D | 68 |
| Impact Strength, ft lbs/in. Notch | 10.4 |
| Heat Deflection Temperature at 264 psi, °C | 59.3 |

The melt rheology of a milled formulation of 100 parts of the copolymer and 3 parts of a liquid organotin mercaptide stabilizer is determined at various shear rates in a Sieglaff-McKelvey Capillary Rheometer at 185° C, as previously described. The rheological flow pattern of this formulation is indicated by the following values:

| Shear Rate, sec$^{-1}$ | Viscosity - poises (× 10$^4$) |
| --- | --- |
| 10$^0$ | 20.5 |
| 10$^1$ | 5.7 |
| 10$^2$ | 1.7 |
| 10$^3$ | 0.40 |
| Shear Rate at Melt Fracture, sec$^{-1}$ | >925 |

By comparison, melt fracture at 188° C in a similarly formulated low molecular weight vinyl chloride homopolymer (specific viscosity = 0.66) occurs at a shear rate of 400 sec$^{-1}$; that of a higher molecular weight homopolymer (specific viscosity = 1.51) occurs at a shear rate of approximately 50 sec$^{-1}$. Melt fracture in these formulated homopolymers is expected to occur at even lower shear rates, if tested at 185° C. Melt fracture at low shear rates is an undesirable property, indicating poor processing characteristics.

EXAMPLE 4

Following the procedure outlined in Example 1, a graft copolymer is prepared in the 100-gallon reactor, using an initial charge formulation of 700 lbs deionized, degassed water, 9 lbs 10 oz of a 2.25% polyvinyl alcohol solution in water, 13.5 lbs of EVA copolymer pellets (UE-644 - Inherent Viscosity = 0.83; Density = 0.97; poly(vinyl acetate) content = 40 weight percent - U.S.I. Chemicals) and 256.5 lbs vinyl chloride monomer. In this experiment, the reaction mixture is raised to 110° C and maintained at this temperature for 60 minutes, before being lowered to 90° C. Approximately 31 liters of water is then injected to attain liquid-full reactor conditions. The maximum operating pressure is 420 psig maintained by the addition of 48.5 liters of $H_2O$ as needed throughout the reaction. The total initiator used which is added incrementally at a prescribed rate is 178.8 g, making a total initiator concentration of approximately 0.15%, by weight of the vinyl chloride charge. The total reaction time from first initiator addition is 2¾ hours.

There is recovered 200 lbs (74% yield) of finished copolymer containing, by weight, 95% vinyl chloride and 5% ethylene/vinyl acetate copolymer.

This product possesses extremely high melt flow properties, exhibiting a Melt Index determined as previously described of 60 gms/10 minutes.

EXAMPLE 5

As an indication of the thermal processing stability of a graft copolymer of this invention, the copolymer product of Example 1 was subjected to a torque rheometer test simulating actual processing conditions, employing a Brabender Plasti-Corder (Brabender Instruments, Inc.) with a small Banbury-type mixing head. Prior to the test, portions of the copolymer were dry-blended with a liquid organotin stabilizer, using for each 100 parts copolymer, 3 parts, by weight, of the stabilizer. Additionally, TiO₂ filler was incorporated in one formulation, while calcium stearate was added to another as lubricant. The dry-blended formulations were then extruded and pelletized under identical conditions. For comparison, a low molecular weight vinyl chloride homopolymer (specific viscosity = 0.66) was similarly formulated and pelletized.

For each test, 50 g of the polymeric material was charged to the mixing head and heating of the mixing head was started in an air atmosphere, simultaneously with operation of the rotor blades (at 50 RPM) and measurement of the torque. Torque was measured by a dynamometer on the motor shaft operating the rotor blades. The plastic temperature was measured by a thermocouple located on the inside surface of the chamber wall between the rotor blades, while the head temperature was measured on a thermometer positioned in a well in the mixing head.

Peak torque occured at the flux point of the polymeric material, after which the torque decreased to a minimum constant level while the temperature of the fluxed stock was raised slightly by continued shearing. Plastic melt and head temperatures were recorded as shearing was continued. When a rise in torque was first noted on the torque-time chart, indicating onset of degradation in the polymeric sample, the test was discontinued. The thermal processing stability time of each sample was measured as that portion of the torque-time curve from the time minimum constant torque was attained until that time when torque rise began again. Results of the tests were as follows:

TABLE 2

| Sample Formulation | Head Temperature °C | Melt Temperature °C | Peak Torque gram-meters | Stability Time minutes |
|---|---|---|---|---|
| Stabilizer | | | | |
| Liquid Organotin Mercaptide | 180 | 175 | 700 | 90 |
| Liquid Organotin Mercaptide + TiO₂ (2 parts) | 170 | 165 | 850–900 | 120 |
| Liquid Organotin Mercaptide + Calcium Stearate (1 part) | 170 | 165 | 800 | 120 |
| Comparative Sample Vinyl Chloride Homopolymer + Liquid Organotin Mercaptide | 180 | 175 | 1000–1100 | 75 |

As the results indicate, less torque is required to flux the formulated copolymer of this invention compared to that required for the low molecular weight homopolymer tested under identical conditions. Likewise, the thermal processing stability time is higher for the copolymer. Therefore, the graft copolymer is more easily processed and exhibits more thermal stability at suitable processing conditions than even a vinyl chloride homopolymer which is regarded as having excellent processing characteristics and adequate thermal processing stability.

EXAMPLES 6–11

To illustrate the improvement in impact strength imparted to vinyl chloride homopolymers by admixing a graft copolymer of this invention therewith, formulations are prepared containing various proportions of two different homopolymer samples of varying average molecular weight and graft copolymer as indicated in the table below. Each formulation contains 3 parts of liquid organotin mercaptide stabilizer (T-66, Metal and Thermit). These are milled on a 2-roll mill at 163° C and then compression molded at 163° C for 3 minutes.

The formulations tested and values obtained are as follows:

TABLE 3

| Example | 6 | 7 | 8 | 9 | 10 | 11 |
|---|---|---|---|---|---|---|
| PVC-1, parts (specific viscosity = 1.08)[1] | 75 | 50 | 25 | — | — | — |
| PVC-2, parts (specific viscosity = 1.36) | — | — | — | 75 | 50 | 25 |
| Graft Copolymer Product of Example 1, parts | 25 | 50 | 75 | 25 | 50 | 75 |
| Impact Strength ft lbs/in. Notch | 1.8 | 8.4 | 16 | 2.1 | 5.9 | 14 |

[1]Determined as previously described.

Straight PVC-1 has an Izod impact strength of 0.9 ft lbs/in. notch, while that of PVC-2, unblended, is 1.1 ft lbs/in. notch. The impact strength of the straight graft copolymer material is 18 ft lbs/in. notch.

EXAMPLE 12

For comparison, vinyl chloride was grafted onto an EVA copolymer at 90° C, charging the entire initiator requirement into the reactor at the start of the reaction as taught by the prior art. The procedure employed was essentially as set forth in Example 2 of U.S. Pat. No. 3,358,054, using the following polymerization formulation:

| | |
|---|---|
| EVA copolymer* | 168 g |
| a,a-Azobisisobutyronitrile (AIBN) | 1.68 g |
| Distilled water | 1854 ml |
| Poly(vinyl alcohol) | 2.8 g |
| Vinyl chloride | 675 g |

*UE-634 copolymer, contains 26–28% polymerized vinyl acetate, by weight.

The polymerization was carried out in a 1-gallon, stainless steel, electrically heated autoclave equipped with an agitator, cooling coil, pressure recorder, monomer and water inlet lines and a vent valve. The AIBN initiator and the EVA copolymer were charged and the autoclave was sealed. The autoclave was evacuated and pressured with vinyl chloride several times to remove air. The vinyl chloride was then added from a tared charge bomb. Agitation was started and the water containing the poly(vinyl alcohol) was added by means of an air pump. The temperature of the reaction mixture was 22° C and the pressure was 38 psig.

The reaction mixture was then agitated under these conditions for 5 hours, after which the reaction temperature was raised to 90° C. At this temperature, the pressure reached 270 psig. The reaction was continued at this temperature for 16 hours, the reaction pressure falling at a slow, continuous rate. Upon cooling and opening the reactor, a major quantity of product (about 70 volume percent) was found to be in the form of a rigid foam mass in the upper part of the vessel. The remaining portion of product was a very coarse, granular material containing numerous large spherical particles. All of the product was degraded, ranging from gray to deep pink in color.

The product was isolated, washed well with water and methanol and dried in a vacuum oven at 38° C. Monomer conversion was essentially quantitative. Anaysis of the product showed a chlorine content of 46.2%, by weight. This was equivalent to an EVA copolymer content in the product of 18.6%, by weight.

Test specimens of the product were prepared as described in Example 1. This copolymer was found to have an impact strength of 8.1 ft lbs/in. notch (ASTM D256-56).

These results indicate that preparation of a vinyl chloride-ethylene/vinyl acetate graft copolymer according to the prior art, with the exception that a polymerization temperature of 90° C, i.e., the minimum reaction temperature of the process of the present invention, is employed, does not provide a thermally stable, free-flowing, pulverulent product having the vastly improved impact strength of the products of this invention. A product of this invention which is prepared utilizing incremental initiator addition throughout in addition to the elevated reaction temperature employed (see Example 2), is a thermally stable product exhibiting an impact strength of 20 ft lbs/in. of notch.

It is to be understood that although the invention has been described with specific reference to particular embodiments thereof, it is not to be so limited, since changes and alterations therein may be made which are within the full intended scope of this invention as defined by the appended claims.

I claim:

1. A process for preparing an easily processed graft copolymer of vinyl chloride on a preformed ethylene/-vinyl acetate copolymer which comprises reacting in an aqueous suspending medium for a time period of from 1 to 12 hours a mixture containing, by weight, from 60% to 95% of vinyl chloride monomer and from 5% to 40% of a preformed ethylene/vinyl acetate copolymer at a temperature of 90–165° C, while injecting a monomer-soluble free-radical type polymerization initiator at a prescribed rate into the reaction mixture during the reaction, said preformed ethylene/vinyl acetate copolymer containing, by weight, from 10% to 40% polymerized vinyl acetate and having an inherent viscosity of 0.50 to 1.50 as measured at 30° C, employing a solution containing 0.25 g of copolymer in toluene.

2. The process of claim 1 wherein the polymerization reaction mixture contains, by weight, from 75% to 85% vinyl chloride monomer and from 15% to 25% preformed ethylene/vinyl acetate copolymer which contains, in turn, from 15% to 30% polymerized vinyl acetate, by weight.

3. The process of claim 1 which is conducted under sufficient pressure as supplied by incremental injection of water into the reactor to provide substantially liquid-full reactor conditions throughout the reaction.

4. The process of claim 3 which is completed in 1–3 hours.

5. The process of claim 1 wherein from 0.01% to 2.0% initiator is employed, based on the total weight of the vinyl chloride monomer.

6. The graft copolymer produced by the process of claim 1 which contains, by weight, from about 60% to 95% of polymerized vinyl chloride and from about 5% to 40% of an ethylene/vinyl acetate copolymer containing, by weight, from 10% to 40% polymerized vinyl acetate, said graft copolymer product exhibiting a melt viscosity no greater than $9 \times 10^4$ poises at 180° C and no greater than $1 \times 10^4$ poises at 210° C when measured at a shear rate of 10 $sec^{-1}$.

7. The graft copolymer product of claim 6 which contains, by weight, from about 75% to 85% of polymerized vinyl chloride and from about 15% to 25% of an ethylene/vinyl acetate copolymer which contains from 15% to 30% of polymerized vinyl acetate, by weight.

* * * * *